May 16, 1939.　　　　　G. NEMETZ　　　　　2,158,905
AXLE BEARING FOR RAILWAY VEHICLES
Filed Feb. 5, 1937
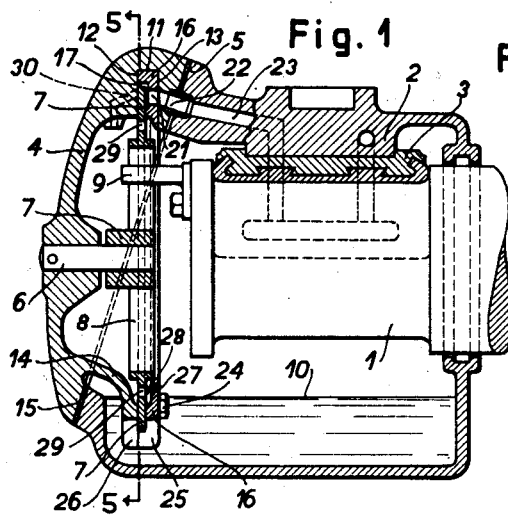
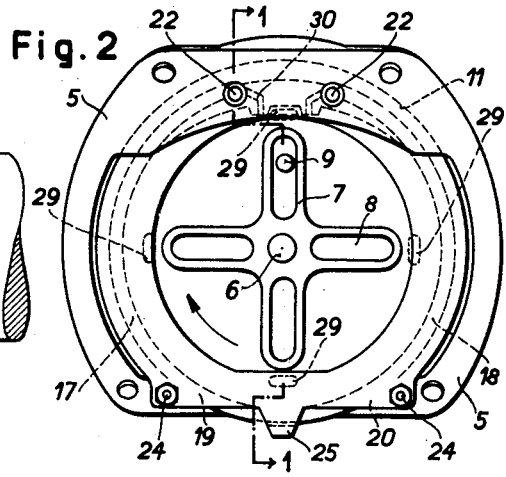
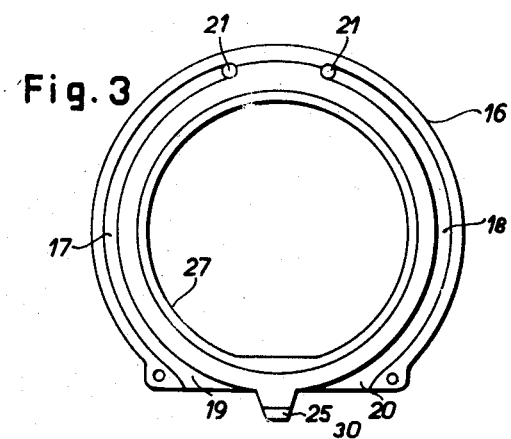
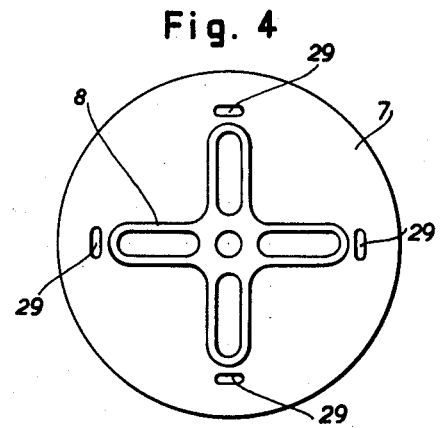
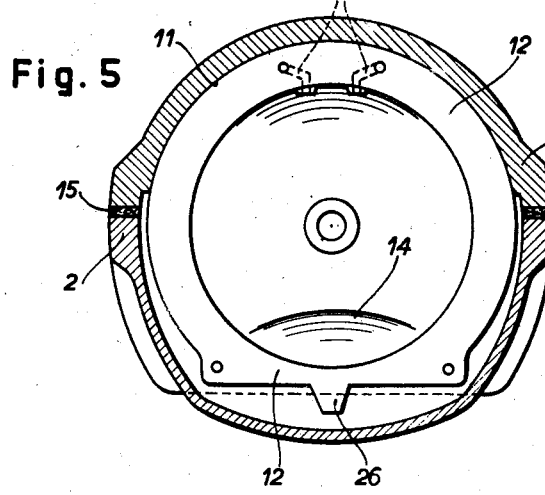
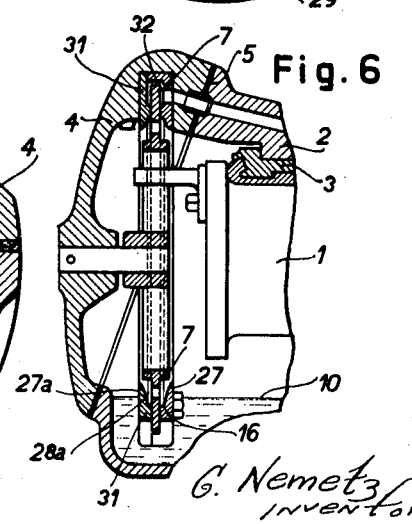
G. Nemetz
INVENTOR
By: Glascock Downing & Seebold
Attys.

Patented May 16, 1939

2,158,905

UNITED STATES PATENT OFFICE 2,158,905

AXLE BEARING FOR RAILWAY VEHICLES

Gustav Nemetz, Vienna, Austria, assignor to firm Alex. Friedmann, Vienna, Austria Application February 5, 1937, Serial No. 124,302
In Austria July 25, 1936

8 Claims. (Cl. 308—85)

This invention relates to a lubricating device for axle bearings of railway vehicles, of the class wherein the casing of the axle box is provided at its outer end with a cover which rests upon this casing along an inclined plane and wherein a disk or the like rotatably mounted on this cover lifts the oil from a sump and feeds the same into narrow annular accumulating spaces or grooves surrounding the disk, wherefrom the oil is delivered to the working surfaces of the bearing.

In lubricating devices of the kind above refered to, there is the inconvenience that the oil lifted from the sump is brought into contact and intimately mixed with the air in the interior of the bearing before it enters into the said narrow spaces or grooves so that air is fed together with oil to the working surfaces. Due to this air admixed to the oil these surfaces are corroded and the oil loses its lubricating properties in a short time. Moreover, it is difficult to arrange said annular spaces or grooves in an air-tight manner and to prevent air from entering into the same.

The present invention has for its object to remove the said inconveniences and to provide a lubricating device of the class above referred to, in which the oil lifted from the sump is immediately fed into said narrow accumulating spaces or grooves so as to prevent a contact between the air and the oil during the whole feeding movement of the latter. A further object of the invention is to provide and to arrange the said accumulating spaces or grooves in an air-tight manner so that the oil passed through these spaces is effectively protected from the access of air. A still further object of the invention is to arrange the lubricating device in such a manner that it may be easily mounted or dismounted.

Two embodiments of the present invention are illustrated by way of example in the accompanying drawing, in which Fig. 1 is a longitudinal vertical section through the bearing, according to line 1—1 of Fig. 2, Fig. 2 shows the cover of the bearing, as seen from the inside, Figs. 3 and 4 show details, Fig. 5 is a section according to line 5—5 of Fig. 1 and Fig. 6 is a partial longitudinal section similar to that of Fig. 1, showing a modified constructional form of the invention.

As shown in Figs. 1 to 5, the axle journal 1 rotates within the bearing substantially comprising the casing 2, the bearing brass 3 and the cover 4 resting upon the casing 2 along a surface 5 which is situated in a plane inclined to the axis of rotation, a packing ring 15 being interposed between the cover 4 and the casing 2. Upon a pin 6 carried by the cover 4, there is rotatably mounted a scooping disk 7 dipping into the oil sump 10. As shown in Fig. 4, this disk is provided with four radially directed slots 8 into one of which engages a finger 9 secured to the axle journal 1.

The upper part of the cover 4 is provided with a circular recess 11 the lateral surfaces 12 and 13 of which are perpendicular to the axis of rotation. The left-hand lateral surface 12 (Fig. 1) extends around the axis of rotation and is formed in its lower part on a projection 14 extending into the interior of the casing 2 from the cover 4. The recess 11 receives the scooping disk 7 and a ring 16 (Fig. 3) having an L-shaped cross-section and embracing the disk 7 at the right-hand side (Fig. 1) and at the periphery. The ring 16 is provided at the side adjacent to the disk 7 with two annular grooves 17 and 18 both situated in the same circle and extending from the lower inlet openings 19 and 20 dipping into the oil sump 10 upwardly to the outlet openings 21 in the ring 16. The openings 21 are in alignment with channels 22 in the cover 4 and these channels are in turn in alignment with channels 23 leading to the working surfaces of the bearing. The ring 16 is forced against the surface 12 of the cover by means of screws 24.

For the purpose of assembling the device the ring 16 together with the disk 7 is inserted into the recess 11 of the cover and then the ring 16 is secured to the cover by means of the screws 24. Thereafter the pin 6 is brought into position and fixed to the cover 4. Finally the cover together with the whole lubricating device connected thereto is applied to the casing 2 and secured thereon.

As shown in Fig. 1, the lower part of the scooping disk 7, of the projection 14 and of the ring 16 together with its openings 19 and 20 dip into the oil sump 10. When the disk 7 is rotated by means of the finger 9 in the direction according to the arrow in Fig. 2, the oil is fed by the disk 7 from the sump 10 immediately into the groove 17 through the opening 19 and since this opening is situated beneath the oil level air is not allowed to enter into the groove 17. The oil is accumulated and set under certain pressure within the groove and is delivered therefrom through the opening 20, channels 22 and 23 to the working surfaces of the bearing. With this direction of rotation the other accumulating groove 18 is inactive. When the disk 7 is rotated in the opposite direction the oil is accumulated and fed within the groove 18.

Through the accumulating groove 17 or 18 which is inactive at a given moment a small amount of air is fed from the working surfaces to the oil sump 10, especially at the beginning of the rotation. Also an excess of oil is refed in the same way to the sump. In order to prevent this air and this oil from directly entering into the active accumulating groove, the inlet openings 19 and 20 are separated from each other by downwardly extending projections 25 and 26 formed on the ring 16 and on the projection 14 of the cover 4 respectively.

In practice, the clearance between the disk 7 on the one hand and the surface 12 of the cover 4 and ring 16 on the other hand cannot be made so small that an air tight seal of the grooves 17 and 18 is obtained. In order to prevent air from entering into these accumulating grooves through this clearance, the ring 16 is provided with a circular rim 27 projecting inwardly to the center of the ring 16 and confining an annular space 28 extending along the ring 16, thus separating this space from the interior of the bearing. This space which is open towards the axis of rotation of the bearing is situated partly on the right side, and partly on the left side of the disk 7 (Fig. 1) and these two parts of the space communicate with one another through a number of holes 29 in the disk. As it will be seen from Fig. 1, the annular space 28 is confined at its left side by the adjacent parts of the cover 4 and of its projection 14.

A small amount of oil set under pressure within the accumulating groove 17 or 18 which is active at a given moment escapes inwardly from this groove through the gaps between the disk 7 and the surface 12 and the ring 16 and is carried around by the rotating disk 7 within the annular space 28. This oil being forced outwardly by the centrifugal force forms therefore an efficient liquid seal thus preventing air from entering into the accumulating groove 17 or 18. It is to be noted that the amount of oil circulating within the annular space 28 is also supplied by the oil delivered by the two channels 30. This oil first lubricates the pin 6 and then flows down along the inner side of the cover 4 and is accumulated in the annular space 28. As it is shown in Fig. 1, the inner edge of the rim 27 projects upwards at the lowermost point sufficiently beyond the level of the oil sump 10 so that oil is prevented from directly passing from the sump into the annular space 28, even if the bearing is inclined during the operation.

The lubricating device as shown in Fig. 6 is substantially constructed in the same manner as that described above. The scooping disk 7, however, is guided at its left-hand side not by a surface of the cover itself, but by a ring 31 interposed therebetween and it will be understood that in this case the projection 14 of the cover is unnecessary. The annular space 28ᵃ is formed between the rims 27 and 27ᵃ of the rings 16 and 31 respectively. The accumulating groove 32 embraces the disk 7 at its periphery, as well as at its both lateral surfaces. The operation of this modified device is the same as that described above in connection with Figs. 1 to 5.

What I claim is:

1. An axle bearing for railway vehicles, comprising a casing containing an oil sump, a cover resting upon this casing along an inclined plane and being provided with a recess on the inside of its upper part, a rotating oil lifting member carried by said cover and dipping into said oil sump, an annular casing secured to said cover and engaging into said recess, said casing surrounding said oil lifting member around its whole periphery and being provided with accumulating grooves at its inner side adjacent to said member, said grooves extending along the periphery of said member and having their lower inlet openings situated beneath the level of said oil sump, and channels to lead oil under pressure from the upper outlet openings of said grooves to the working surfaces to be lubricated.

2. An axle bearing for railway vehicles, comprising a casing containing an oil sump, a cover resting upon the casing along an inclined plane and being provided with a recess on the inside of its upper part, a projection extending downwardly from the hollow space of said cover into the oil sump, said recess being provided with an inner surface perpendicular to the axis of rotation which extends to said projection so that an annular surface is formed, a rotating oil lifting member carried by said cover and dipping into said oil sump, a ring surrounding said oil lifting member on one side around its whole periphery and being inserted in said recess and secured to said annular surface so as to make a tight joint thus forming together with this annular surface an oil lifting casing for said member, said ring being provided with accumulating grooves at its inner side adjacent to said member, said grooves extending along the periphery of said member and having their lower inlet openings situated beneath the level of said oil sump and channels to lead oil under pressure from the upper outlet openings of said grooves to the working surfaces to be lubricated.

3. An axle bearing for railway vehicles, comprising a casing containing an oil sump, a cover resting upon this casing along an inclined plane and being provided with a recess on the inside of its upper part, a rotating oil lifting member carried by said cover and dipping into said oil sump, two rings held within said recess and surrounding said oil lifting member around its whole periphery, said rings being provided with accumulating grooves at their inner sides adjacent to said member, said grooves having their lower inlet openings situated beneath the level of said sump and closed channels connecting the upper outlet openings of said grooves with the working surfaces to be lubricated.

4. An axle bearing for railway vehicles, comprising a casing containing an oil sump, a cover resting upon the casing along an inclined plane and being provided with a recess on the inside of its upper part, a projection extending downwardly from the hollow space of said cover into the oil sump, said recess being provided with an inner surface perpendicular to the axis of rotation which extends to said projection so that an annular surface is formed, a rotating oil lifting member carried by said cover and dipping into said oil sump, a ring surrounding said oil lifting member on one side around its whole periphery and being inserted in said recess and secured to said annular surface so as to make a tight joint thus forming together with this annular surface an oil lifting casing for said member, said ring being provided with accumulating grooves at its inner side adjacent to said member, said grooves extending along the periphery of said member and having their lower inlet openings situated beneath the level of said oil sump, an inwardly projecting rim on said ring, running around the periphery of the ring so as to separate an annular space within this ring from the interior of the bearing and channels to lead oil under pressure from the upper outlet openings of said grooves to the working surfaces to be lubricated.

5. An axle bearing for railway vehicles, comprising a casing containing an oil sump, a cover resting upon this casing along an inclined plane and being provided with a recess on the inside of its upper part, a rotating oil lifting member carried by said cover and dipping into said oil sump, two rings held within said recess and surrounding said oil lifting member around its whole periphery, said rings being provided with accumulating grooves at their inner sides adjacent to said member, said grooves having their lower inlet openings situated beneath the level of said sump inwardly projecting rims on said rings so as to form an annular space therebetween, and channels to lead oil under pressure from the upper outlet openings of said grooves to the working surfaces to be lubricated.

6. An axle bearing for railway vehicles, comprising a casing containing an oil sump, a cover resting upon the casing along an inclined plane and being provided with a recess on the inside of its upper part, a projection extending downwardly from the hollow space of said cover into the oil sump, said recess being provided with an inner surface perpendicular to the axis of rotation which extends to said projection so that an annular surface is formed, a rotating oil lifting member carried by said cover and dipping into said oil sump, a ring surrounding said oil lifting member on one side around its whole periphery and being inserted in said recess and secured to said annular surface so as to make a tight joint thus forming together with this annular surface an oil lifting casing for said member, said ring being provided with accumulating grooves at its inner side adjacent to said member, said grooves extending along the periphery of said member and having their lower inlet openings situated beneath the level of said oil sump, an inwardly projecting rim on said ring, running around the periphery of this ring so as to separate an annular space within this ring from the interior of the bearing, the lowermost point of the inner edge of said rim being situated above the level of said oil sump, and channels to lead oil under pressure from the upper outlet openings of said grooves to the working surfaces to be lubricated.

7. An axle bearing for railway vehicles, comprising a casing containing an oil sump, a cover resting upon this casing along an inclined plane and being provided with a recess on the inside of its upper part, a rotating oil lifting member carried by said cover and dipping into said oil sump, two rings held within said recess and surrounding said oil lifting member around its whole periphery, said rings being provded wth accumulating grooves at their inner sides adjacent to said member, said grooves having their lower inlet openings situated beneath the level of said sump, inwardly projecting rims on said rings so as to form an annular space therebetween, the lowermost points of the inner edges of said rims being situated above the level of said oil sump, and channels to lead oil from the upper outlet openings of said grooves to the working surfaces to be lubricated.

8. An axle bearing for railway vehicles, comprising a casing containing an oil sump, a cover resting upon the casing along an inclined plane, a rotating oil lifting member carried by said cover and dipping into said oil sump, an annular casing secured to said cover and surrounding said oil lifting member around its whole periphery and being provided with accumulating grooves at its inner side adjacent to said member, said grooves extending along the periphery of said member and having their lower inlet openings situated beneath the level of said oil sump, a downwardly extending projection provided on said annular casing between said inlet openings so as to separate these openings from each other, and channels to lead oil under pressure from the upper outlet openings of said grooves to the working surfaces to be lubricated.

GUSTAV NEMETZ.